Sept. 22, 1953    H. D. DRAIN    2,652,866
TEMPLATE
Filed April 24, 1951
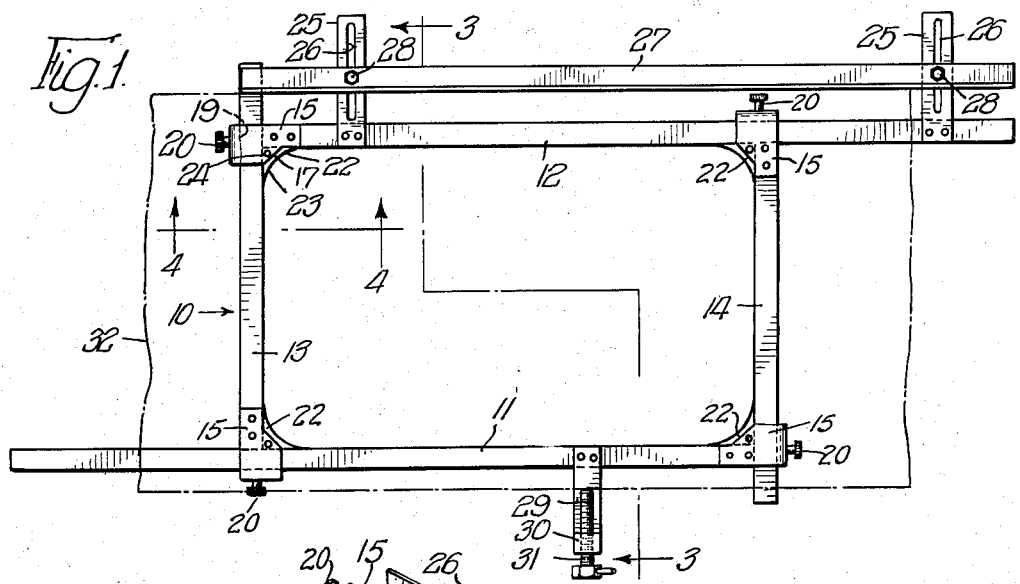
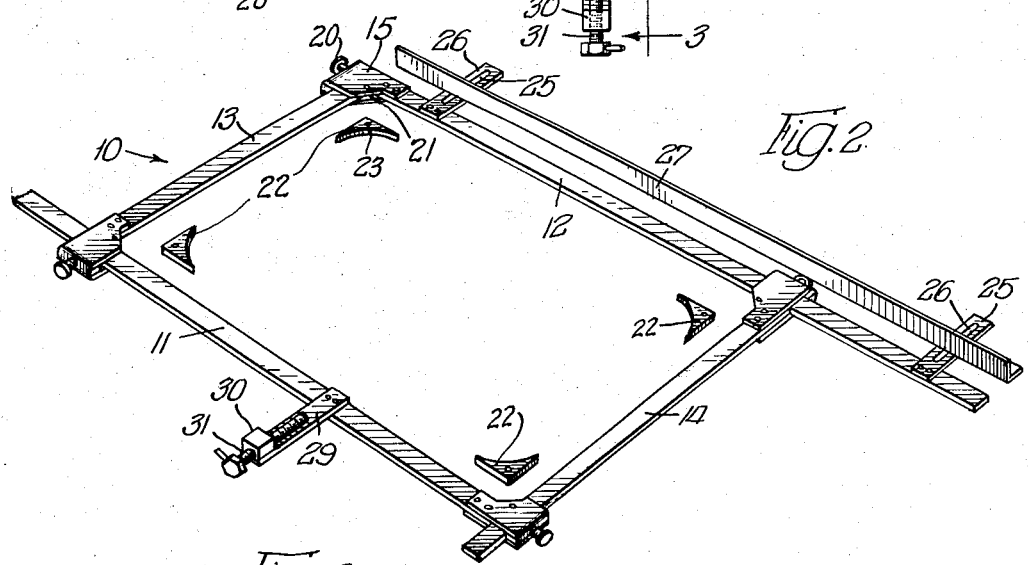
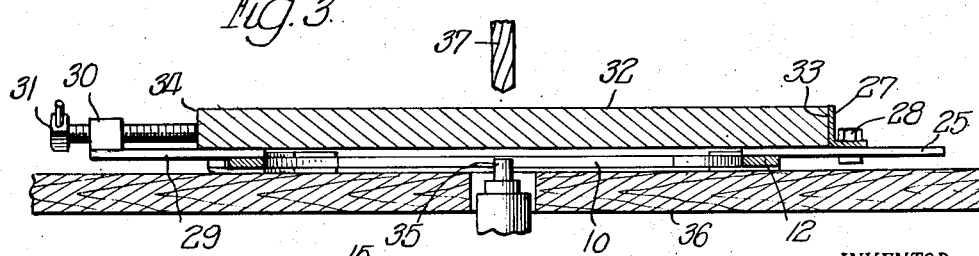
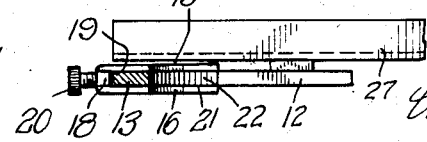
INVENTOR.
Herbert D. Drain,
BY
Cromwell, Grist & Warden
Attys.

Patented Sept. 22, 1953

2,652,866

UNITED STATES PATENT OFFICE 2,652,866

TEMPLATE

Herbert D. Drain, Chicago, Ill., assignor to Walter E. Selck and Co., Chicago, Ill., a corporation of Illinois Application April 24, 1951, Serial No. 222,710

6 Claims. (Cl. 144—144.5)

This invention relates to mechanisms for cutting or routing an aperture in a board or panel, and is more particularly concerned with an adjustable form or template for guiding the board or panel while it is engaged with the cutting or routing tool.

In the manufacture of cabinet sinks, sink counters or similar sink supporting structures, a generally rectangular aperture is provided in the sink receiving top or drainboard of a size sufficient to accommodate the sink and a clamping or mounting frame for securing the sink in the aperture. Commercially the aperture in the sink top has been provided by securing a template of the proper size in the desired location on one face of the cabinet top and cutting the aperture on a routing machine having a cutting or routing bit above the work table in alignment with a spindle about which the sink top is moved, the spindle being engaged with the inner edge of the template to guide the bit during the routing operation.

It is a general object of the present invention to provide a template or guide member for use with a routing machine to cut an aperture in a sink cabinet top or other work piece, which template is so constructed that it may be adjusted to provide for apertures of different size.

It is a more specific object of the invention to provide a template for use with a routing machine which comprises pairs of slidably connected side and end bar members in combination with clamping elements adjustably mounted on oppositely disposed side bar members for securing the template in position on the face of a board or other work piece.

It is a further object of the invention to provide an adjustable template of the type described in combination with means for mounting thereon removable inserts at the corners of the same, which inserts have inner curved surfaces forming rounded corner guide surfaces.

These and other objects of the invention will be apparent from a consideration of the template which is shown by way of illustration in the accompanying drawings, wherein:

Fig. 1 is a plan view of a template incorporating therein the principal features of the invention;

Fig. 2 is an exploded perspective view of the template;

Fig. 3 is a transverse section, taken generally on the lines 3—3 of Fig. 1, with a work piece and portions of a routing machine being indicated; and Fig. 4 is a detail section, taken generally on the line 4—4 of Fig. 1.

Referring to the drawings, there is illustrated a template which is adapted to be positioned in clamping engagement on one face of a work piece, such as a sink top or drainboard, after being adjusted to the proper size, to provide a guide or track for the cutting tool of a routing machine, the inner face of the template being engageable with the spindle projecting above the work table of the routing machine and the work piece being movable in a path defined by the template while the cutting tool is engaged with the work piece.

The template 10 comprises oppositely disposed elongate front and rear side bar members 11, 12 and oppositely disposed elongate end bar members 13 and 14. The side bar members 11 and 12 are designated front and rear bar members, respectively, for convenience is description only. Each of the bar members 11, 12, 13 and 14 is generally rectangular in cross section and each is provided at one end with a guideway formation for connecting the same in adjusted relation at a right angle with the adjoining bar member. This connecting structure is described in connection with rear bar member 12, it being understood that it is the same on each of the other bar members.

As shown in Figs. 1 and 4, bar member 12 is provided at its one end with top and bottom plate members 15 and 16 which are secured on opposite or top and bottom faces of the bar member and extend beyond the end of the same. The plate members 15 and 16 are widened at the outer end so that they extend inwardly a substantially greater distance than the inner edge of the body of the bar member and are tapered at the inner corner at 17 to the same width as the bar member. At the outer end the plates 15 and 16 are connected by a filler block 18 which defines with the plates and the end of the bar member 12 a guideway forming recess 19 extending transversely of the longitudinal axis of the bar member 12 and of a size slightly larger than the cross-section of the adjoining end bar member 13 which is adapted to be received in sliding relation in the recess 19. The end block 18 is provided with a set screw 20 which is adapted to extend through a threaded aperture in the same for clamping engagement with the bar member 13 whereby the bar members 12 and 13 may be clamped in adjusted relation. The widened outer portions of the plates 15 and 16 provide a corner pocket 21 between the same which opens inwardly of the template frame and which is adapted to receive a corner forming filler plate or insert 22 having a curved or rounded inner edge 23 and which is adapted to be secured in the recess 21 by a set screw 24 extending in threaded relation through an aperture in the top plate 15 to engage with the insert 22. The curved inner edge of the insert 22 corresponds to the curved corner of a sink flange. Inserts having curved edges of different radius may be furnished with the template for interchangeable positioning in the corner recess 21. Each of the other bar members 11, 13 and 14 is connected in sliding relation with the adjoining bar member in the same manner as bar members 12 and 13 so that the entire frame may be adjusted as desired.

The back bar member 12 is also provided adjacent its opposite ends with identical bracket plates 25 which are slotted at 26. The bracket plates 25 extend outwardly of bar member 12 in parallel relation. A clamping bar 27 of angular cross-section is adjustably mounted on the bracket plates 25 and held in fixed adjusted relation thereon by clamping bolts 28 extending through apertures in the horizontal flange of the same and the slots 26 in the brackets 25.

The front bar member 11 is provided with a forwardly extending bracket plate 29 and a block 30 secured at the end thereof having a clamping screw 31 extending in threaded relation through an aperture therein. The clamping screw 31 cooperates with the rear clamping bar 27 to clamp the template 10 to the work piece.

In using the template, the bar members 11, 12, 13 and 14 are adjusted relative to each other to provide the size aperture desired. The bar members are clamped in adjusted position by taking up on the set screws 20. Corner inserts 22 of the proper size are inserted in recesses 21 and locked in place by screws 24. The back clamp member 27 is then adjusted to provide the desired distance from the back edge of the aperture to the back of the drainboard or other work piece 32 (Fig. 3) and the latter is placed with its back edge 33 against the clamp bar 27, the clamping screw 31 being withdrawn on the opposite bar member 11. The clamp screw 31 is then taken up to engage the forward edge 34 of the drainboard 32. With the template 10 clamped to the drainboard 32 the inner edge of the frame which the template forms is positioned against the spindle 35 extending upwardly of the work bed 36 of the router machine, and the bed 36 and router bit 37 are moved relative to each other to engage the router bit 37 with the drainboard 32 and begin the cutting operation. The drainboard 32 is then moved about on the work bed 36 keeping the spindle 35 engaged with the template 10 until the cutting operation is completed. Any number of drainboards or other pieces may be cut in this manner to provide the same with the size aperture for which the template is adjusted. When it is desired to provide the work piece with a different size aperture the template may be readjusted and the clamp members 31 and 27 rearranged as desired to locate the work piece so that the aperture will be cut in the proper location therein.

While the illustrated device has been described in connection with the routing of an aperture in a panel-like work piece, it may be employed as a guide for routing an aperture or a design in any suitable member.

I claim:

1. An adjustable template for use in routing an aperture in a panel-like work piece which template comprises oppositely disposed elongate bar members arranged in parallelogram formation, each of said bar members having a guideway recess formed at one end and extending transversely of the length thereof, said recess receiving the adjoining bar member in sliding relation therein, a set screw extending into said recess and adapted to engage in clamping relation with the bar member therein, a recess in the inner edge of each of said bar members adjacent said guideway recess for receiving a removable corner forming insert, a clamp member having a portion extending upwardly of one of said elongate bar members and adapted to be arranged substantially parallel therewith, brackets on said last mentioned elongate bar member mounting said clamp member for adjustment relative thereto, and a clamping screw mounted on the opposite one of said elongate bar members for cooperation with said clamp member whereby to clamp said template to the work piece.

2. An adjustable template for use in routing an aperture in a panel-like work piece which template comprises oppositely disposed elongate bar members arranged in rectangular formation, each of said bar members having a guideway recess formed at one end which extends transversely of the length thereof for receiving the adjoining bar member in connected sliding relation therewith, clamping means adapted to secure said bar member in said recess, means in the inner edge of each of said bar members adjacent said guideway recess for detachably securing a corner forming insert, a clamp having a portion extending upwardly of one of said elongate bar members and adapted to be arranged substantially parallel therewith, means for mounting said clamp on said last mentioned bar member for adjustment relative thereto, and a cooperating adjustable clamping member mounted on the opposite one of said elongate bar members whereby to clamp said template to the work piece.

3. An adjustable template for use in cutting an aperture in a panel-like work piece which template comprises oppositely disposed elongate bar members arranged in rectangular formation, each of said bar members having a guideway forming recess at one end thereof for receiving the adjoining bar member in connected sliding relation therewith at substantially a right angle thereto, means on the inner edge of each of said bar members adjacent said guideway forming recess for securing a corner forming insert, and clamp means on oppositely disposed bar members mounted for adjustment relative thereto for securing said template to the work piece.

4. In apparatus of the type described, the combination of two pairs of elongate bar members arranged in rectangular formation with the respective bars of each pair in substantially parallel opposed relation, each bar member having an enlarged portion at one end provided with an aperture extending transversely of the length of the bar member and of a cross-section corresponding approximately to the cross-section of the body of the adjacent bar member whereby to receive said adjacent bar member in slidable relation therethrough, means for clamping said bar members in connected adjusted relation to form a generally rectangular frame and cooperating oppositely disposed clamp members on a pair of said bar members for clamping said frame to one face of a generally rectangular work piece.

5. In apparatus of the type described, the combination of two pairs of elongate bar members arranged in rectangular formation with the respective bars of each pair in substantially parallel opposed relation, each bar member having an enlarged portion at one end provided with an aperture extending transversely of the length of the bar member and of a cross-section corresponding approximately to the cross-section of the body of the adjacent bar member whereby to receive said adjacent bar member in slidable relation therethrough, means for clamping said bar members in connected adjusted relation to form a generally rectangular frame, means for detachably securing in the inner corners of said frame inserts having a curved inner edge, and cooperating oppositely disposed clamp members on a pair of said bar members for clamping said frame to one face of a generally rectangular work piece.

6. In apparatus of the type described, the combination of two pairs of elongate bar members arranged in rectangular formation with the respective bars of each pair in substantially parallel opposed relation, each bar member having an enlarged end portion provided with an aperture extending transversely of the length of the bar member and of a cross-section corresponding approximately to the cross-section of the body of the adjacent bar member whereby to receive said adjacent bar member in slidable relation therethrough, means for clamping said bar members in connected adjusted relation to form a generally rectangular frame, means on said enlarged end portions to secure inserts in the inner corners of the frame, said inserts having a curved inner edge, and cooperating oppositely disposed adjustably mounted clamp members on a pair of said bar members for clamping said frame to a face of a generally rectangular work piece.

HERBERT D. DRAIN.

References Cited in the file of this patent

UNITED STATES PATENTS

| Number | Name | Date |
|---|---|---|
| 150,039 | Hills | Apr. 21, 1874 |
| 513,313 | Etherington | Jan. 23, 1894 |
| 688,634 | Gray et al. | Dec. 10, 1901 |
| 700,813 | Phillips | May 27, 1902 |
| 1,679,074 | Carter | July 31, 1928 |
| 1,830,113 | Kew | Nov. 3, 1931 |
| 2,451,207 | Ferguson | Oct. 12, 1948 |
| 2,605,791 | Zern | Aug. 5, 1952 |